United States Patent
Hart et al.

(10) Patent No.: US 9,408,036 B2
(45) Date of Patent: Aug. 2, 2016

(54) MANAGING WIRELESS BEACON DEVICES

(71) Applicant: Cisco Technology, Inc., San Jose, CA (US)

(72) Inventors: Brian D. Hart, Sunnyvale, CA (US); Raghuram Rangarajan, Santa Clara, CA (US); Sujai Hajela, Saratoga, CA (US); Gregory H. Yamanishi, San Jose, CA (US); Gracia Wang, Sunnyvale, CA (US); Allen J. Huotari, Garden Grove, CA (US)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 14/278,546

(22) Filed: May 15, 2014

(65) Prior Publication Data

US 2015/0334676 A1    Nov. 19, 2015

(51) Int. Cl.
| | |
|---|---|
| *H04W 24/00* | (2009.01) |
| *H04W 4/02* | (2009.01) |
| *H04W 4/00* | (2009.01) |
| *H04W 64/00* | (2009.01) |
| *H04L 29/06* | (2006.01) |

(52) U.S. Cl.
CPC .............. *H04W 4/028* (2013.01); *H04W 4/008* (2013.01); *H04W 4/02* (2013.01); *H04W 64/00* (2013.01); *H04L 69/22* (2013.01)

(58) Field of Classification Search
CPC ........ H04W 4/008; H04W 4/02; H04W 64/00
USPC ............. 455/404.2, 412.1–414.2, 418–422.1, 455/456.1–457, 41.1, 42.1; 370/328–332, 370/338
See application file for complete search history.

(56) References Cited

U.S. PATENT DOCUMENTS

| | | | |
|---|---|---|---|
| 5,642,303 | A | 6/1997 | Small et al. |
| 8,260,320 | B2 | 9/2012 | Herz |
| 8,284,748 | B2 | 10/2012 | Borghei |
| 8,396,485 | B2 | 3/2013 | Grainger et al. |
| 8,458,184 | B2 | 6/2013 | Dorogusker et al. |
| 8,669,902 | B2 | 3/2014 | Pandey et al. |
| 8,676,182 | B2 | 3/2014 | Bell et al. |
| 8,718,644 | B2 | 5/2014 | Thomas et al. |
| 2008/0004041 | A1* | 1/2008 | Ahn ...................... H04W 64/00 455/456.1 |
| 2012/0023552 | A1 | 1/2012 | Brown |
| 2012/0115512 | A1 | 5/2012 | Grainger et al. |
| 2012/0167207 | A1 | 6/2012 | Beckley et al. |

(Continued)

*Primary Examiner* — Babar Sarwar
(74) *Attorney, Agent, or Firm* — Edell, Shapiro & Finnan, LLC

(57) ABSTRACT

Wireless transmissions from beacon devices are received at a plurality of receiver devices. The wireless transmissions comprise packets that carry information used for location-based services for mobile wireless devices. Content of one or more fields of the beacon packets received by one or more of the plurality of receiver devices is obtained. Measurement data associated with the transmissions received at the plurality of receiver devices is generated. Locations of the respective beacon devices are computed from the measurement data obtained by the plurality of receiver devices. Information identifying detected beacon devices and their locations are stored to maintain a location history of beacon devices over time locations. Changes from information contained in the location history are detected based on the locations computed for respective beacon devices from the measurement data and content of one or more fields of detected beacon packets.

25 Claims, 7 Drawing Sheets

(56) References Cited

U.S. PATENT DOCUMENTS

| | | |
|---|---|---|
| 2013/0115916 A1 | 5/2013 | Herz |
| 2013/0203445 A1 | 8/2013 | Grainger et al. |
| 2013/0317944 A1 | 11/2013 | Huang et al. |
| 2013/0343198 A1 | 12/2013 | Chhabra et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0118113 A1 | 5/2014 | Kaushik et al. |

* cited by examiner

MANAGING WIRELESS BEACON DEVICES

TECHNICAL FIELD

The present disclosure relates to wireless systems.

BACKGROUND

Wireless beacon devices have been developed to provide additional services to wireless user devices, such as Smartphones and other mobile wireless user devices. As one example, a wireless beacon device may be a low-powered, low-cost transmitter that sends a packet containing information to provide location-based services to wireless user devices. Numerous such beacon devices would be deployed in various indoor and outdoor venues to provide location-based information services, such as advertisements, to wireless user devices.

DESCRIPTION OF EXAMPLE EMBODIMENTS

Overview

Techniques are presented herein for managing wireless beacon devices. Wireless transmissions from beacon devices are received at a plurality of receiver devices. The wireless transmissions of the beacon devices comprise packets that carry information used for location-based services for mobile wireless devices. For example, the packets transmitted by the beacon devices include information that advertises location-based services, such as according to the Bluetooth® Low Energy communication protocol. Content of one or more fields of the packets transmitted by the beacon devices and received by one or more of the plurality of receiver devices is obtained. Measurement data associated with the transmissions received at the plurality of receiver devices is generated. The measurement data is for use in determining locations of the beacon devices. Locations of the respective beacon devices are computed from the measurement data obtained by the plurality of receiver devices. Information identifying detected beacon devices and their locations are stored to maintain a location history of beacon devices over time locations. Changes from information contained in the location history are detected based on the locations computed for respective beacon devices from the measurement data and content of one or more fields of detected beacon packets. Changes that are determined may lead to declaring that a beacon device has moved to a new location, that a new beacon device has been detected, or that a beacon device is missing.

Example Embodiments

Figure 1:
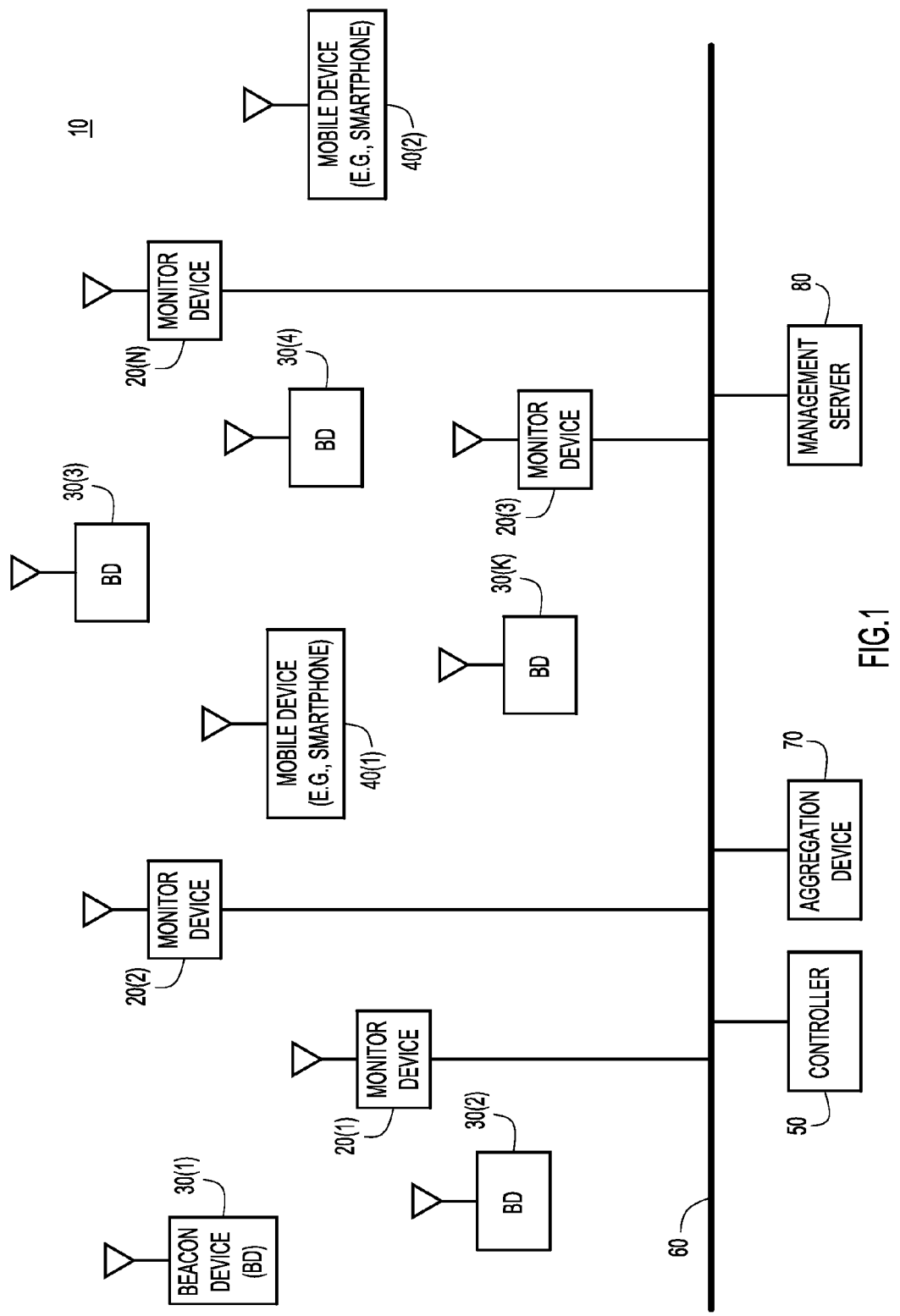
FIG. 1 is a system diagram of a plurality of monitor devices that are used to monitor activity in a frequency band to detect and identify beacon devices, according to an example embodiment.

Reference is first made to FIG. 1. FIG. 1 shows a system 10 that includes a plurality of monitor devices 20(1)-20(N) that are configured to receive wireless transmissions from beacon devices 30(1)-30(K). The monitor devices 20(1)-20(N) are receiver devices, for example. The wireless transmission of the beacon devices 30(1)-30(K) comprise packets that carry information used for location-based services for mobile wireless devices, such as the mobile wireless devices shown at reference numerals 40(1) and 40(2). Many more mobile devices are typically present, but for simplicity only two are shown in FIG. 1.

The monitor devices 20(1)-20(N) may be managed by a controller 50 that is also in communication, via network (e.g., local area network, wide area network, wireless mesh or mixed wired and wireless network) 60, with an aggregation device 70 and a management server 80. The controller 50 may be a wireless local area network controller, in one example.

The beacon devices 30(1)-30(K) can be any wireless device, that, in one example, are transmit-only capable, and which wirelessly transmit advertisements for location-based services for use by mobile wireless devices. In one example, the beacon devices 30(1)-30(K) are small low-cost, wall-powered or battery-powered, wireless devices that are configured to transmit in accordance with a short-range communication standard, e.g., a wireless personal area network (WPAN) communication protocol, such the Bluetooth wireless communication protocol, and in particular, the advertising mode of the Bluetooth Low Energy (BLE) communication protocol. In one example, the beacon devices transmit packets in accordance with a proprietary packet format. Some Bluetooth devices, such as those that support Bluetooth 4.0, also support the BLE protocol. In another example, the beacon devices transmit advertisements or other information in accordance with the IEEE 802.11/Wi-Fi wireless communication protocol. In general, the beacon devices can operate in accordance with any wireless communication protocol.

Furthermore, in one example, the monitor devices 20(1)-20(N) are wireless local area network (WLAN) access points (APs) or sensors/receivers configured to operate in accordance with the IEEE 802.11, aka, Wi-Fi™ wireless communication standard. Some WLAN APs have an extra radio receiver/transceiver that can be used to scan a frequency band (e.g., the 2.4 GHz and/or the 5 GHz frequency bands in the United States) to detect signals from WLAN devices and from non-WLAN devices operating in that frequency band. Thus, WLAN APs can be configured to detect signals from beacon devices that operate in accordance with the BLE protocol. The detection of beacon packet transmissions can be performed with an extra radio receiver/transceiver or with a single radio transceiver (that is also used to serve WLAN traffic).

Beacon devices 30(1)-30(K) are location-aware, context-aware, pervasive small wireless beacons that can be used to provide location-based services for mobile devices, e.g., devices 40(1) and 40(2), in a venue (e.g., a store, mall, or other public venue). The beacon devices 30(1)-30(K) can send notifications of items nearby that are on sale or items which customers may be looking for, and can enable payments at a point of sale (POS) terminal.

There is a need for comprehensive and automated management of beacon devices. Examples of management scenarios include detecting when a beacon device is moved (whether accidentally or intentionally), and detecting a missing beacon device, which may occur if a person steals a beacon device or a battery in a beacon device becomes depleted and it can no longer transmit. In addition, it would be useful to detect untrusted or unauthorized beacon devices, so-called "rogue" beacon devices.

Figure 2:
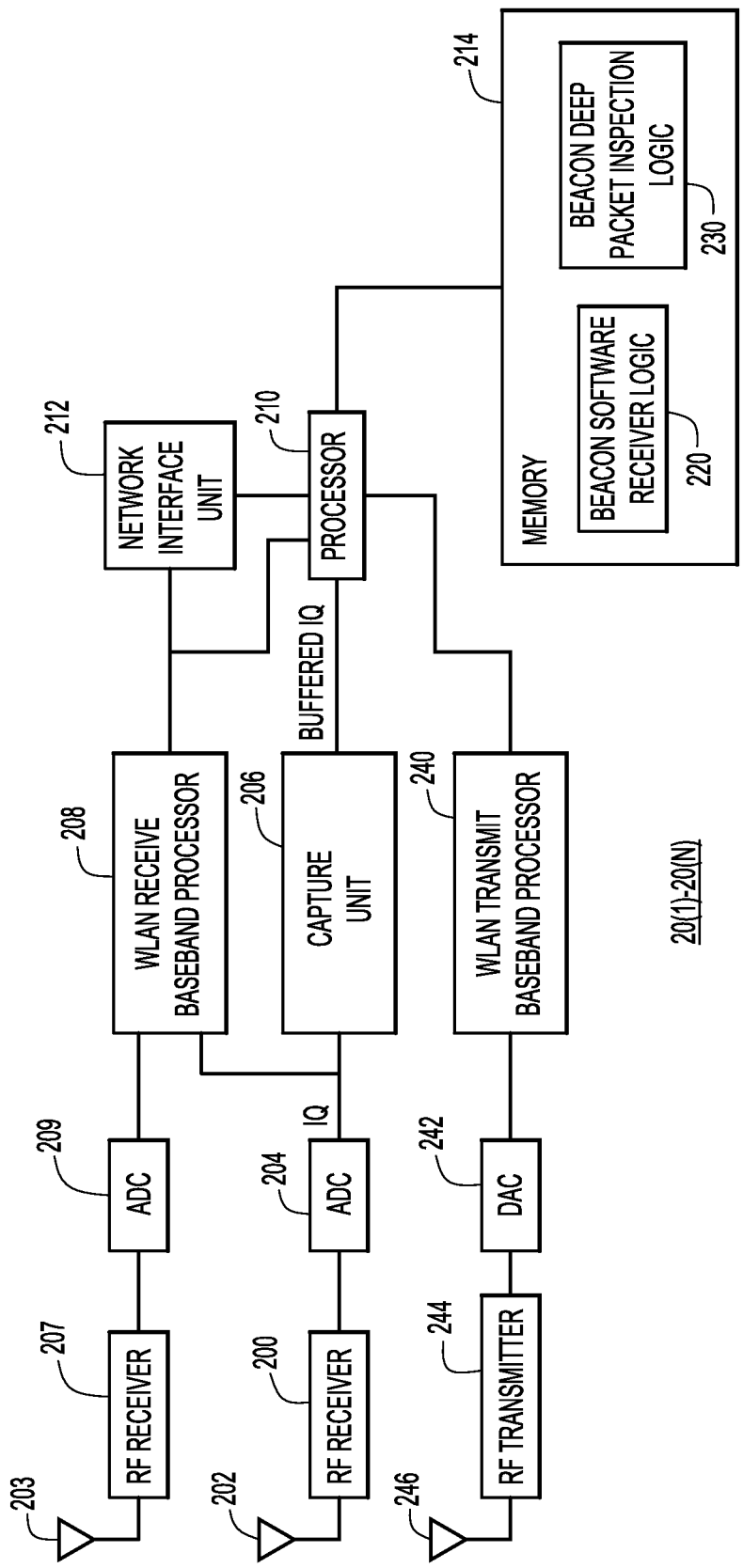
FIG. 2 is a block diagram of a monitor device, according to an example embodiment.

Reference is now made to FIG. 2. FIG. 2 illustrates an example block diagram of any of the monitor devices 20(1)-20(N). The monitor devices may be any wireless receiver device that is capable of detecting and decoding packets transmitted by beacon devices, and forwarding information obtained from the packets for management operations. As explained above, in one example, a WLAN AP can be configured to perform these monitoring and reporting functions. The advantage of using WLAN APs is that they are often already present or used in a typical venue where beacon devices are deployed, and APs operate in the frequency band in which beacon devices transmit.

In one example, each monitor device includes a radio frequency (RF) receiver (downconverter) 200 connected to an antenna 202. The output of the RF receiver 200 is supplied to an analog-to-digital converter (ADC) 204. The digital output from the ADC 204 is supplied to a capture unit 206 and to a WLAN receive baseband processor 208. In one variation, a separate and dedicated RF receiver is provided for each of the capture unit 206 and the WLAN receive baseband processor 208. For example, RF receiver 200 and ADC 204 may be dedicated to the capture unit 206, and RF receiver 207 (with associated antenna 203) and ADC 209 are dedicated to the WLAN receive baseband processor 208. In such a situation, the RF receiver 207 dedicated to the WLAN receive baseband processor 208 may be part of a WLAN RF transceiver. Further, it should be understood that the RF receiver 200 may be part of an RF transceiver. Moreover, in order to receive signals in both the 2.4 GHz band and 5 GHz band, a monitor device that is a WLAN AP may include still another RF transceiver dedicated to the 5 GHz band.

The monitor device further includes a processor 210, a network interface unit 212 and memory 214. The processor 212 is a microprocessor or microcontroller, for example. The processor 212 executes instructions stored in memory 214, including instructions for beacon software receiver logic 220 and beacon packet deep packet inspection logic 230.

Memory 214 may comprise read only memory (ROM), random access memory (RAM), magnetic disk storage media devices, optical storage media devices, flash memory devices, electrical, optical, or other physical/tangible memory storage devices. Thus, in general, the memory 214 may comprise one or more tangible (non-transitory) computer readable storage media (e.g., a memory device) encoded with software comprising computer executable instructions and when the software is executed (by the processor 210) it is operable to perform the operations described herein in connection with the beacon software receiver logic 220 and beacon packet deep packet inspection logic 230.

While FIG. 2 shows that the beacon receiver function is performed by way of software, this is not meant to be limiting. It is also possible to have a dedicated hardware module/block that acts as an extra/third radio dedicated to decoding beacon packets for beacon movement/tracking and rogue beacon device detection.

In addition, in the case where the monitor device is a WLAN AP, there is further provided a WLAN transmit baseband processor 240, a digital-to-analog converter (DAC) 242, an RF transmitter 244 and one or more antennas 246 for use by the RF transmitter 244. The WLAN receive baseband processor 208 and the WLAN transmit baseband processor 240 may be integrated as part of a single application specific integrated circuit (ASIC) that performs modem functions of a WLAN AP. Likewise, the RF receiver 200 and RF transmitter 244 may be part of a WLAN RF transceiver. Further still, the same one or more antennas used for RF receiving may be used for RF transmission.

The capture unit 206 is, for example, a hardware block implemented in digital logic gates as part of or separate from a modem. The ADC 204 may output in-phase (I) and quadrature-phase (Q) receive data (denoted "IQ" in FIG. 2) from I and Q receive signals output by the RF receiver 200. The capture unit 206 buffers the IQ receive data for output to the processor 210.

The processor 210 executes the instructions for the beacon software receiver logic 220 to analyze the buffered IQ samples output by the capture unit 206 in order to perform start and end of beacon packet detection, as well as automatic gain control (AGC), carrier recovery, timing recovery and equalization to detect beacon packets. Moreover, the beacon software receiver logic 220 performs the function of identifying the appropriate portion of a beacon packet to obtain an accurate Receive Signal Strength Indication (RSSI) or other signal characteristic measurement of a detected/received beacon packet, based on output from the capture unit 206. Thus, the capture unit 206 outputs IQ samples along with RSSI values for the samples. Still another function of the beacon software receiver logic 220 is to dwell on channels on which the beacon packets are expected to be transmitted. These channels may be in between WLAN (Wi-Fi) channels. Thus, in executing the beacon software receiver logic 220, the processor 210 controls the channel of the RF receiver 200 to dwell on the beacon channels The processor 210 generates, as output from execution of the beacon software receiver logic 220, bits that make up a beacon packet.

The processor 210 executes the beacon deep packet inspection logic 230 to perform cyclic redundancy checking, and to obtain content of one or more fields of the beacon packets. The content of one or more fields of the beacon packet is used to identify the source of a beacon packet, that is, the beacon device from which the beacon packet is received. The one or more fields may contain one or more identifiers that are used to identify a beacon packet that transmitted the packet. Furthermore, a particular piece of information contained in a field of the beacon packet may include information useful for path loss estimation associated with a beacon packet received at a monitor device. For example, the beacon packet may include a calibration value, such as RSSI at a particular distance, e.g., 1 meter, antenna type of the beacon device, which can be used to derive the transmit power that was used to transmit the beacon packet, which, together with the actual measured RSSI of the beacon packet, can be used to compute a path loss for location computations, i.e., path loss=transmit power−RSSI. Thus, to summarize, a calibration value can be obtained from a receive beacon packet, where the calibration value indicates a receive signal strength at a predetermined distance, and a transmit power used to transmit the beacon packet is derived based on the calibration value to enable computation of a path loss using the transmit power and receive signal strength associated with reception of the beacon packet at one of the monitor devices.

In the case of BLE beacon devices, as explained above, BLE transmissions are on channels that are between Wi-Fi channels. As a result, for monitor devices that are WLAN APs and which do not have a separate radio receiver/transceiver dedicated to monitoring (e.g., RF receiver 200 shown in FIG. 2), an algorithm may be performed to control the WLAN APs to go off of Wi-Fi channels to the special channels where the BLE transmissions will occur.

In the case in which a separate radio receiver is not available in a WLAN AP for dedicated beacon packet monitoring, the following is an example of a scheduling algorithm that may be used to go off-channel in order to detect beacon packets. First, the number of off-channel scans for beacons may be limited, e.g., 1 scan every 25 ms, per minute.

Beacon packets may be transmitted at regular time intervals. Therefore, the timing phases of off-channel scans will be roughly aligned, so that they cover the full period over time. Taking the example of a 100 ms period, 5 phases may be allocated to cover the period.

In the case of the 2.4 GHz band in the United States, which has 3 frequently used non-overlapping channels, rather than scanning all 3 frequencies at once on which a beacon packet may be transmitted, which would create a longer service outage with more impact to WLAN service, a different frequency is visited per off-channel scan. Scanning on any of the 3 frequencies should be able to result in detection, so the inclusion of all 3 frequencies can increase detection probability.

Since 3 (frequencies) and 5 (phases) are relatively prime, all phases and frequencies would be visited once every 15 dwells. Randomization to the order may be applied such that the 15 frequency-phase possibilities are visited to break up such unwanted synchronization. Similarly, a small random jitter may be added into the nominal time so that beacon packet pulses near the edges do not require waiting for a long phase drift to separate.

Detection and demodulation of narrow band signals can be impaired when other signals are nearby in the band. Since specific frequencies are targeted, frequency filters may be applied to limit a search to a smaller frequency range than the full dwell. Rather than processing a 20 MHz block of spectrum, the search may be limited to a couple MHz around the nominal frequency.

Finally, channel scanning may already enable the 11 U.S. channels in the 2.4 GHz band. Since these are overlapping channels, several of them would be expected to overlap the middle frequency used by a beacon device. This time can also be examined, and may speed up detection in simpler RF environments, as well as increase the update rate for location measurements.

Figure 3:
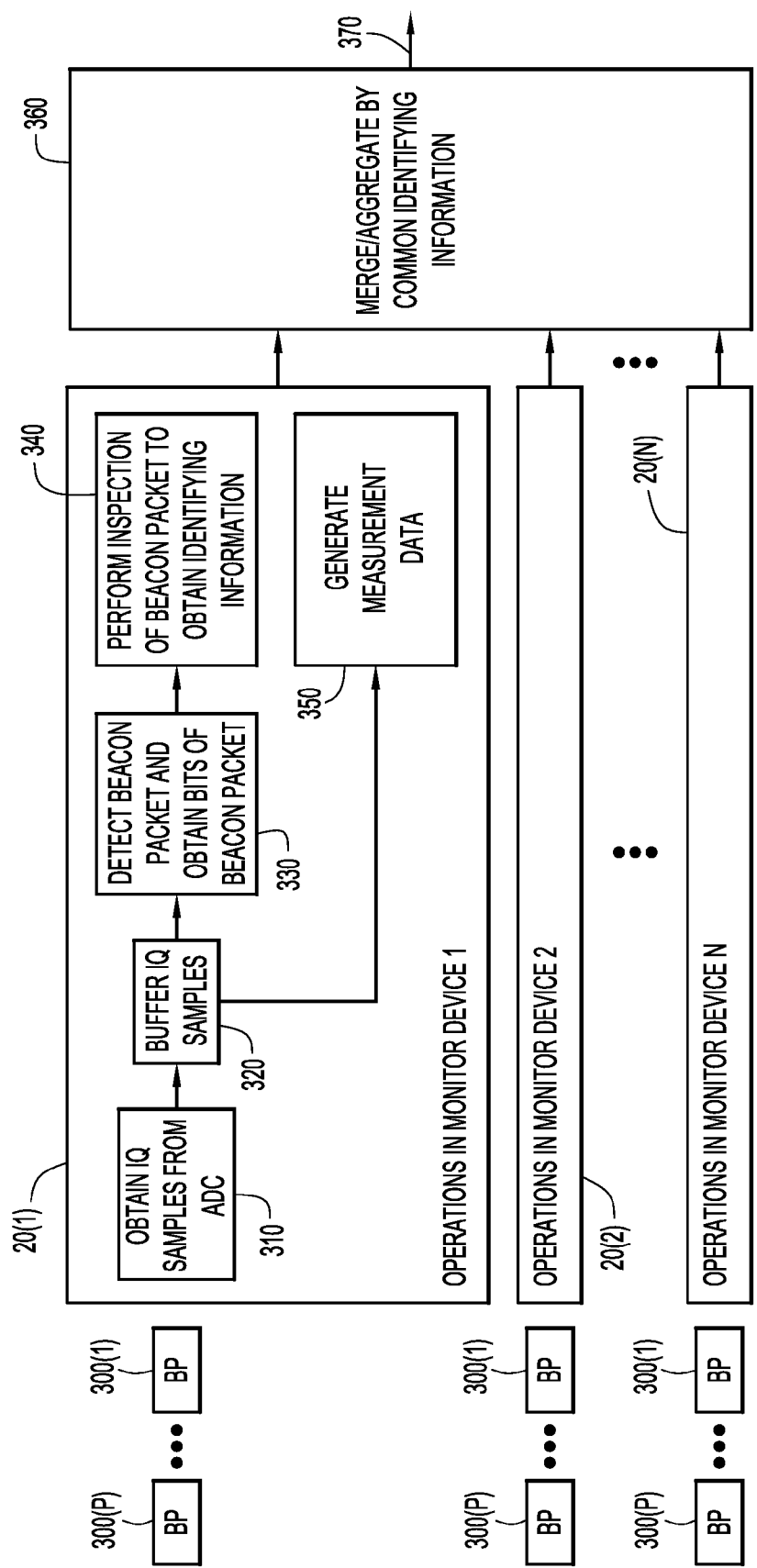
FIG. 3 is a data flow diagram illustrating how a plurality of monitor devices generate data from detected beacon packets for aggregation and further analysis by a management server, according to an example embodiment.

Reference is now made to FIG. 3. FIG. 3 illustrates a paradigm of the processing flow made by a plurality of monitor devices, e.g., APs. The goal of this processing is for each monitor device 20(1)-20(N) to generate data indicating detection of beacon packets, and to inspect one or more fields of the beacon packets in order to extract identifying information of the beacon device that transmitted the beacon packet and other information contained in the beacon packet, e.g., payload data such as temperature, battery life, etc. For example, an alarm or notification can be generated by the management server 80 if beacon packet payload contains information indicating battery level of a beacon has gone below a threshold. More generally, data from received beacon packets can be obtained that represents operational state of beacon devices (e.g., depleted battery—battery charge falling below a threshold), and an alert can be generated or a notification message sent to a network administrator person or entity, wherein the notification message includes information representing operational state of beacon devices. This is useful for scheduling replacement or service of a beacon device before an outage occurs, e.g., during a sales or promotional event.

In addition, the monitor devices 20(1)-20(N) generate measurement data associated with detection of beacon packets. As explained above, the measurement data is used for determining locations of the beacon devices, and may include RSSI, time-of-arrival, angle of arrival, etc. Each monitor device associates a time-stamp with the measurement data it generates for a beacon packet detection. Beacon packets transmitted by one or more beacon devices are shown at reference numeral 300(1)-300(P). Note that not all of these packets would likely be detected by all of the monitor devices 20(1)-20(N). Depending on the location of the beacon devices and the location of the monitor devices 20(1)-20(N), some monitor devices will detect different beacon packets than the beacon packets that other monitor devices detect. Furthermore, the monitor devices 20(1)-20(N) may be time-synchronized so that the measurement data they generate can be correlated to the same beacon devices to achieve more accurate location estimation.

More specifically, each of the monitor devices 20(1)-20(N) performs a series of operations using the components described above in connection with FIG. 2, referred to again in connection with the description of FIG. 3. Each of the monitor devices 20(1)-20(N) performs these operations, but for simplicity, this is shown in FIG. 3 only for monitor device 20(1). At 310, IQ receive data samples are obtained from output of the ADC. At 320, the IQ samples are buffered and time-stamped by the capture unit 206. At 330, the processor 210, through execution of the beacon software receiver logic 220, processes the IQ samples to detect beacon packets and to obtain bits of detected beacon packets. At 340, the processor 210, through execution of the beacon packet deep packet inspection logic 230, obtains content of one or more fields of the beacon packets, e.g., used to derive identifying information of the source of the packet as well as any payload, e.g., battery life, temperature, and RSSI calibration data (e.g., RSSI at 1 meter). Also, at 350, measurement data is generated based on the buffered IQ samples, such as RSSI, time-of-arrival, angle-of-arrival, etc. At 360, the packet source identifier data and measurement data obtained by the monitor devices 20(1)-20(N) are merged/aggregated together.

As depicted in FIG. 3, the data generated by each of the monitor devices 20(1)-20(N) is repeatedly collected and merged/aggregated across the monitor devices 20(1)-20(N) based on common identifying information extracted from the beacon packets. This aggregation/merge operation may be performed by the controller 50, aggregation device 70 the management server 80, or any other entity that has access to data from multiple monitor devices. For example, if beacon packet 300(1) is detected by monitor devices 20(1), 20(2), 20(3) and 20(4), then a data set would be generated, such as that shown below in Table 1.

TABLE 1

| Packet Source Identifier | Monitor Devices at which Detected | Time of Detection | Measurement Data (e.g., RSSI) | Payload Data (if any) |
|---|---|---|---|---|
| XXYYYY | 1 | 18:22:24 | −50 dBm | |
| XXYYYY | 2 | 18:22:24 | −70 dBm | |
| XXYYYY | 3 | 18:22:24 | −80 dBm | |
| XXYYYY | 4 | 18:22:24 | −75 dBm | |

The data stored for each detected beacon packet may include data for the entire packet, frequency on which the packet was detected, bandwidth of the packet, etc.

Similar aggregation/merging are performed for other beacon packets detected at two or more monitor devices. It is also possible that a beacon packet is detected by only one monitor device. At 370, the packet source identifiers and list of monitor device identifiers (e.g., Media Access Control (MAC) address), and measurement data are forwarded to the management server 80. If the MAC address of the beacon packet is unique, then the MAC address can be used as an identifier to merge data associated with beacon packet detection across the monitor devices.

In one example, and not by way of limitation, the beacon packets may be BLE packets according to the following example format. This packet format includes the following fields:
Preamble—1 Byte fixed at 0xAA
Access Address or Code—4 Bytes fixed at 0x8E89BED6
Cyclic Redundancy Code (CRC)—3 Bytes: checksum calculated over PDU
PDU (Protocol Data Unit)—38 Bytes, that includes:
  Advertising Channel PDU Header byte
  Advertising Channel PDU Header byte
  Bluetooth Media Access Control (MAC) address
  Manufacturer Specific Data field identifier
  Universally Unique Identifier (UUID)
    i. Major ID—a 16-bit unsigned integer to differentiate between beacons within the same proximity UUID.
    ii. Minor ID—a 16-bit unsigned integer to differentiate between beacons with the same proximity UUID and major ID value.
  Measured power (encoded as 8-bit U2 value)—RSSI at 1 meter.

Since the MAC address of these example packets are always the same value, it cannot be used to merge packets together detected by multiple monitor devices. However, data obtained from these packets can be merged/aggregated across monitor devices on the basis of UUID. Thus, in one example, the packet source identifier is a UUID, UUID plus major ID, or UUID plus major ID and minor ID. In the event that somehow additional identifiers, such as UUID, major ID and minor ID are similar, RF related parameters, such as frequency, periodicity of beacon signals, bandwidth, can be used as an identifier to merge beacon packets detected across monitor devices. For other types of beacon packet formats that include a MAC address, the MAC address can be used as a source identifier to merge packets detected by multiple monitor devices.

Beacon devices could get broken, their batteries can become depleted, moved around, stolen, or a person may move something that is large and metal such that the signals from the beacon device are blocked or disrupted, etc. It is therefore useful to provide a process to monitor beacon devices to ensure they are where they should be, at any particular venue and across multiple venues where beacon devices may be deployed.

Figure 4:
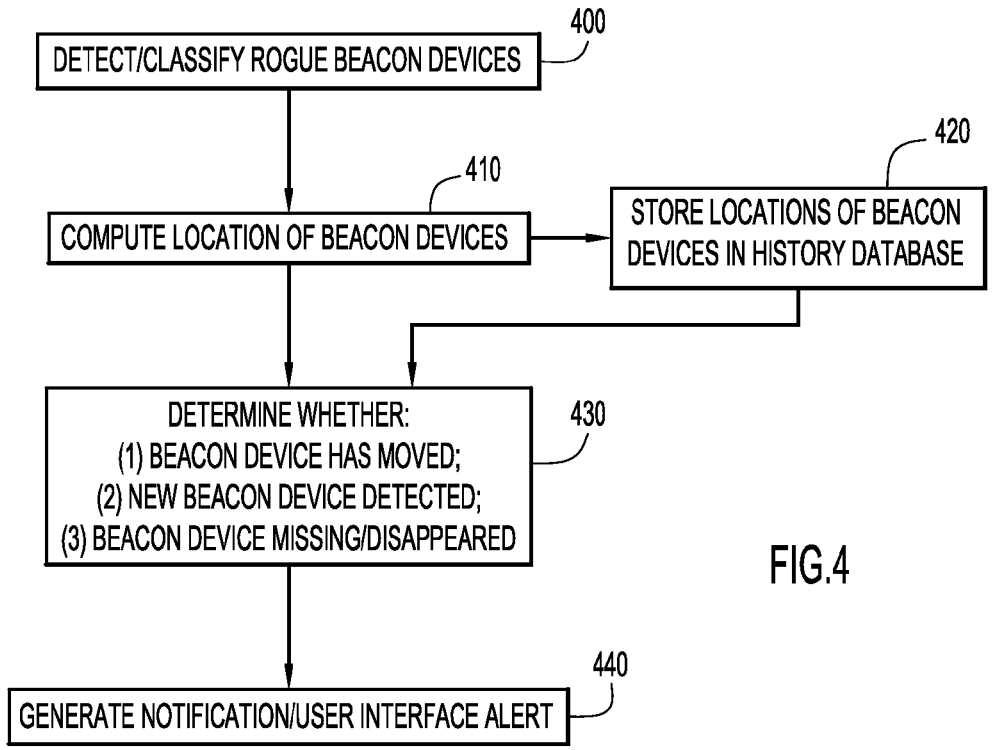
FIG. 4 is a flow chart illustrating operations of the management server, according to an example embodiment.

Reference is now made to FIG. 4. FIG. 4 illustrates a flow chart generally depicting operations performed by the management server 80, for example, on the basis of the data obtained from the monitor devices. At 400, on the basis of the data obtained from the monitor devices, and in particular the packet source identifier information (e.g., MAC address, UUID, UUID plus major ID or UUID plus major ID and minor ID), a "rogue" beacon device is classified/detected. Further details on the rogue detection/classification are described hereinafter in connection with FIG. 5.

At 410, for rogue and non-rogue beacon devices, the locations of the detected beacon devices are determined, using the measurement data and known locations of the monitor devices. There are numerous ways of computing locations of the detected beacon devices using the measurement data and known locations of the monitor devices. Examples of such location computation methods include RSSI-based computations, time-of-arrival based computations, angle-of-arrival based computations, or any combination of these or other techniques now known or hereinafter developed.

At 420, the locations of the beacon devices are stored in a history database. This allows the management server 80 to perform additional checks/determinations. At 430, it is determined, on the basis of data stored in the history database, whether one or more of: (1) a beacon device has moved to a new location; (3) a new beacon device has been detected; and (3) a beacon device is missing or has disappeared. After a rogue device is detected, a notification or user interface alert is generated and sent, at 440, as described hereinafter.

Several checks may be made at operation 430. One check may be made to determine whether a previously detected beacon device has moved to a new location. For example, if a beacon device has been moved, then one or more of the detecting monitoring devices would detect a different signal characteristic measurement (e.g., RSSI), and/or new monitoring devices would report signal characteristic measurements (e.g., RSSI) for that beacon device, such that the location estimate of the beacon device, computed at 410, is significantly different from the location stored in the history database. In one example, if the location estimate for a beacon device changes by greater than a configured threshold number of feet, then the beacon device is considered to have been moved and a notification is made accordingly. If only one monitoring device (or a small number of monitoring devices) detects the beacon device, and the location estimate is very coarse, a signal characteristic measurement difference threshold between current and past measurements can also be used as a metric to identify a moved beacon device. In another example, for purposes of determining whether a beacon device has moved to a new location, a location of a beacon device may be compared with information describing a perimeter within which the beacon device is expected to be located. For example, a beacon device could be expected to move around within a venue, such as a beacon device on a shopping cart or medical equipment (e.g., a defibrillator), or move around within a region of a venue (e.g., toy department). However, if the beacon devices go outside of a particular region, then a declaration that it has moved is generated.

Another check that can be made is to determine whether a new beacon device has been detected. A new beacon device is detected when the identifying information (e.g., MAC address, UUID, etc.) of a detected beacon packet does not match information stored in the history database for a previously detected beacon device. In addition, for purposes of determining whether a new beacon device has been detected, the location of the beacon device may be compared with information describing a predetermined perimeter or region, and if, for example, a beacon device appears for the first time within (or outside) a predetermined perimeter or region, then it is declared to be a new beacon device. When a new beacon device is detected, its location is computed as shown at 410 and an entry is created for storage in the history database at 420.

Still another check made at 430 is to determine whether a beacon device, that was previously detected, has gone missing or disappeared. If the management server 80 has not received an update from any of the previously detecting monitoring devices about a specific beacon device for a given period of time T or has not received a predetermined number of measurement reports from monitor devices (e.g., within a predetermined period of time), then the beacon device is declared missing. The network administrator can be informed about the same and the last known location can be used to investigate what happened to the device.

At 440, notifications and/or user interface alerts are generated for presentation to a network administrator. The alerts/notifications may include information: identifying a beacon device that it has been moved, indicating that a new beacon device has been detected (and which new beacon device could be a rogue device), and/or identifying a beacon device that has gone missing or disappeared. This allows a network administrator to take appropriate action, such as deploying a replacement beacon device for one that has gone missing, moving a beacon device that has been moved back to its original location, etc. The notifications may take the form of an email, text message, pop-up alert on a user interface display screen, and may be include audio, animated video, text, etc.

Figure 5:
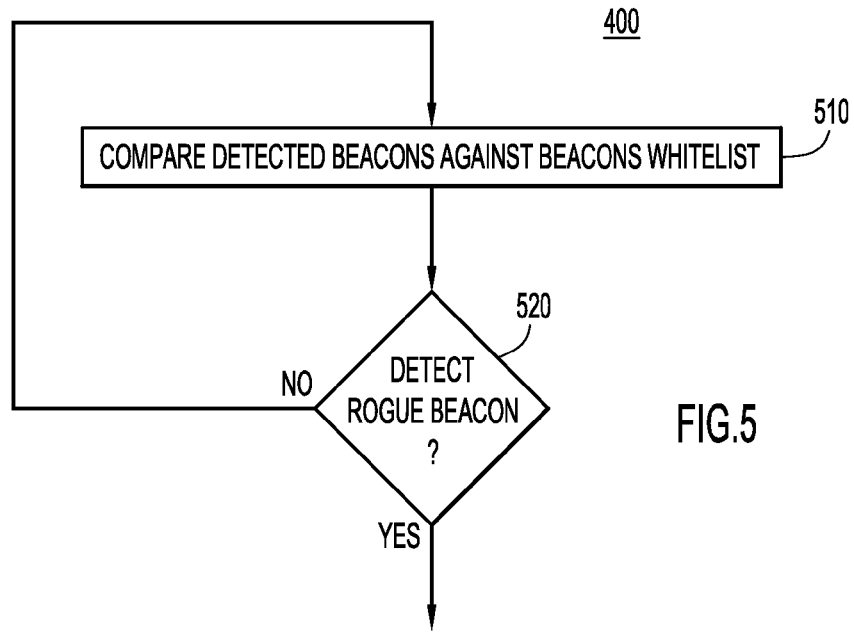
FIG. 5 is a flow chart illustrating operations to classify/detect rogue beacon devices, according to an example embodiment.

Turning now to FIG. 5, further details about detecting/classifying rogue beacon devices are described. As explained above, a beacon whitelist is created based on information provided by/obtained from a network administrator, or access is made, via the Internet for example, to a centralized managed online whitelist database or service. The whitelist contains a listing, by identifying information, of the allowable beacon devices in a given venue. The whitelist may be partitioned by venue such that a single whitelist may be maintained for a plurality of venues. At 510, using identifying information obtained from detected beacon packets from one or more monitoring devices, a comparison is made of the identifying information against the beacons whitelist. At 520, it is determined whether a rogue beacon is detected if the identifying information of a detected beacon packet is not contained in the whitelist as an allowed beacon device. A "rogue" beacon device may be referred to as an "unauthorized" beacon device or "untrusted" beacon device. Thus, the whitelist may contain a list of identifying information for authorized or trusted beacon devices.

For example, and not by way of limitation, a detected UUID is compared with the whitelist, and a rogue beacon device can be detected immediately. A UUID is used by the operating system in a mobile wireless device to awaken an application on the mobile device. A rogue beacon device with a valid UUID and a false major/minor ID still awakens the correct venue application, so it is not destructive as a beacon device with a non-whitelisted UUID that awakens another venue's application on the mobile wireless device. Since at 410 in FIG. 4, the management server locates each detected beacon device, even rogue beacon devices, appropriate measures can be taken to deal with a rogue beacon device. For example, a network administrator can remove/disable a rogue beacon device.

In a more fine-grained rogue detection example, a group of beacon devices (e.g., based on UUID and major ID) or individual beacon devices (e.g., based on UUID, major ID and minor ID) may be whitelisted. Any device outside a whitelist is flagged as a rogue device.

In still another example, a beacon device can be flagged as a rogue device if it fails to match pattern information related to advertising content carried by a beacon packet or advertising source. For example, a new beacon device that identifies the correct store (or chain of stores) but the beacon device has not yet been explicitly listed in the whitelist, may be cleared as a non-rogue device. However, a beacon device that transmits beacon packets with advertising content for a competitor store or a protestor entity, is not permissible, and would be declared as a rogue device.

Further still, location information can be used to limit or control when a rogue beacon device declaration is made. Reporting and/or tracking of beacon devices located outside a marked perimeter can be limited. That is, beacon devices that are detected outside a predetermined perimeter or region can be ignored for purposes of rogue reporting. Thus, the analyzing performed for rogue detection may include comparing a location of a beacon device with respect to information describing a predetermined perimeter or region for purposes of determining whether a beacon device is an unauthorized beacon device.

Figure 6:
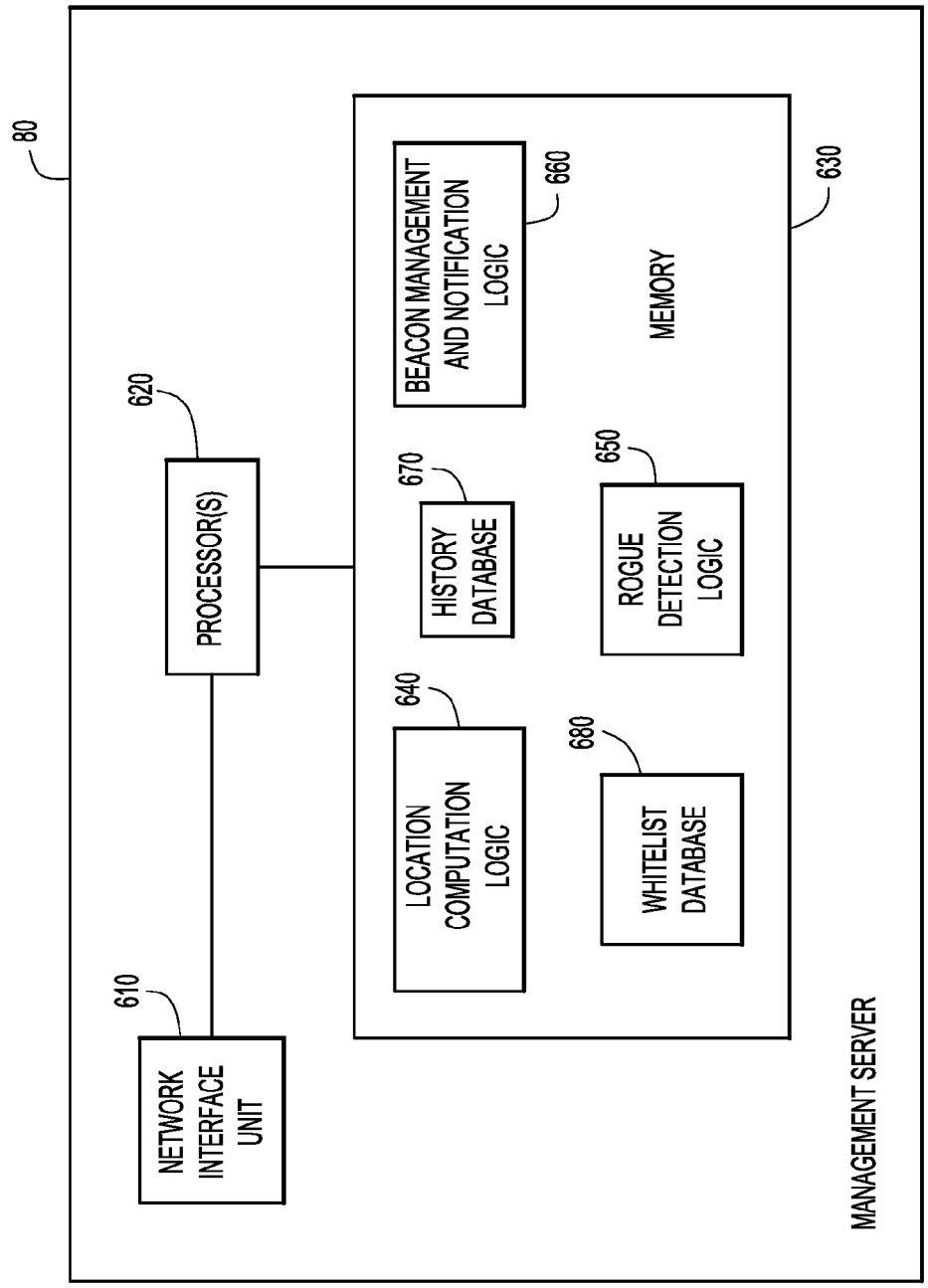
FIG. 6 is a block diagram of the management server, according to an example embodiment.

Reference is now made to FIG. 6. FIG. 6 shows an example block diagram of the management server 80. The management server 80 may be a physical device, e.g., one or more server computers, or it may be embodied by one or more applications running in a data center/cloud computing environment. The management server 80 includes a network interface unit 610 that enables network communication to receive data from, and send data to, the monitoring devices 20(1)-20(N), wireless network controller 50 and aggregation device 70 (if the wireless network controller 50 and aggregation device 70 are employed). The management server 80 further includes one or more processors 620 and memory 630. The memory 630 may take any of the forms referred to above for memory 214 described above in connection with FIG. 2. The processor 620 is, for example, a microprocessor or microcontroller, and executes instructions and operates on data stored in memory 630.

To this end, the memory includes instructions for location computation logic 640, rogue detection logic 650 and beacon management and notification logic 660. In addition, the memory stores data for a history database 670 and a whitelist database 680. The processor 620 executes the instructions for the location computation logic 640 in order to compute location estimates of detected beacon devices based on signal characteristic measurement data of beacon packets obtained from monitor devices, and stores the location estimates, together with beacon identifying information, in the history database 670. The location computation logic 640 also includes data representing the locations of the monitor devices 20(1)-20(N), used for location computations of beacon devices. The processor 620 executes the rogue detection logic 650 to classify/detect rogue beacon devices based on data stored in the whitelist database 680. The processor executes the beacon management and notification logic 660 to perform the beacon movement detection, new beacon detection, and missing beacon detection, as well as notification/user interface alert operations described above in connection with FIG. 4. It should be understood that the functions of the management server 80 may be embodied by one or more applications running in a data center/cloud computing environment.

Figure 7:
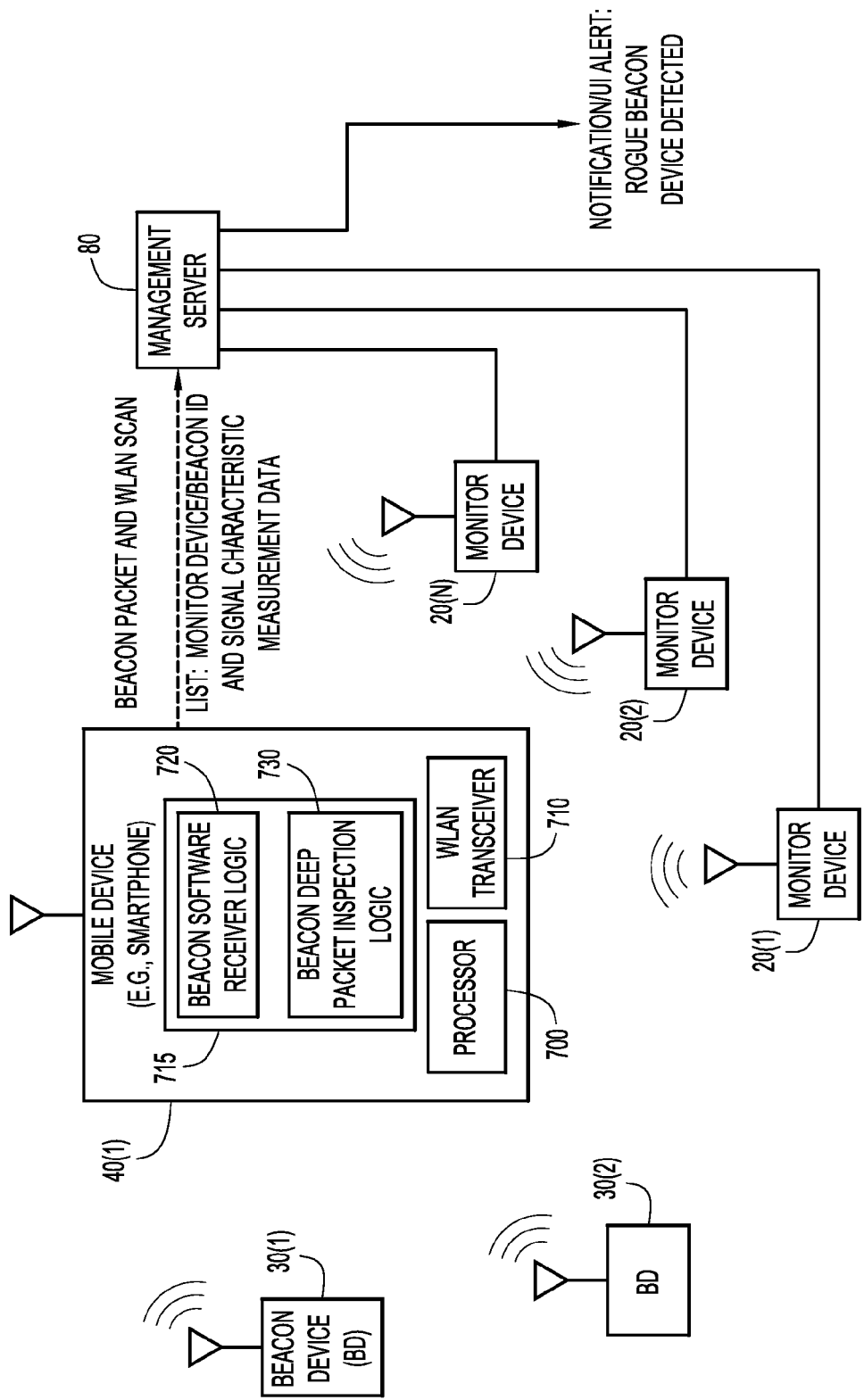
FIG. 7 is a diagram of a system and depicting a variation of the system shown in FIG. 1, where a mobile wireless device participates in the detection of beacon devices.

Reference is now made to FIG. 7. FIG. 7 illustrates a variation/enhancement to the system 10 described above with reference to FIG. 1. In this variation, mobile wireless devices, e.g., mobile device 40(1) shown in FIG. 7, participate in the beacon discovery and management process. Specifically, mobile device 40(1) includes a processor 700, a WLAN transceiver 710, and memory 715. Instructions for beacon software receiver logic 720 and beacon deep packet inspection logic 730 are stored in the memory 715 for execution by the processor 700, similar to that described above for monitor devices 20(1)-20(N) in connection with FIG. 1. Instead of beacon software receiver logic 720 and beacon deep packet inspection logic 730, the mobile device 40(1) may perform these functions with dedicated hardware, e.g., a Bluetooth chipset that receives and decodes Bluetooth packets. Regardless of the specific implementation, one or more mobile wireless devices can have the beacon packet detection capabilities of the monitor devices 20(1)-20(N).

As a result, mobile device 40(1), for example, can send, through its serving access point (which may be one of the monitor devices 20(1)-20(N)) or via a wide area wireless network, a message to an address associated with the management server 80, where the message includes data resulting from beacon packet detections and WLAN detections (of other monitor devices/APs), and in particular including a list of monitor devices detected and beacon packet identifying information along with signal characteristic measurement data of beacon packet detections (for location computation purposes). The mobile device 40(1) can include in the message a query to the management server 80 as to whether a detected beacon device is whitelisted (valid) or a rogue. If the response to the mobile device's query from the management server 80 indicates that a beacon device is a rogue, the mobile device may send a notification to a network administrator associated with operating the beacon devices at a particular venue. Moreover, the management server 80 may generate a notification/user interface alert to be sent to a network administrator.

Figure 8:
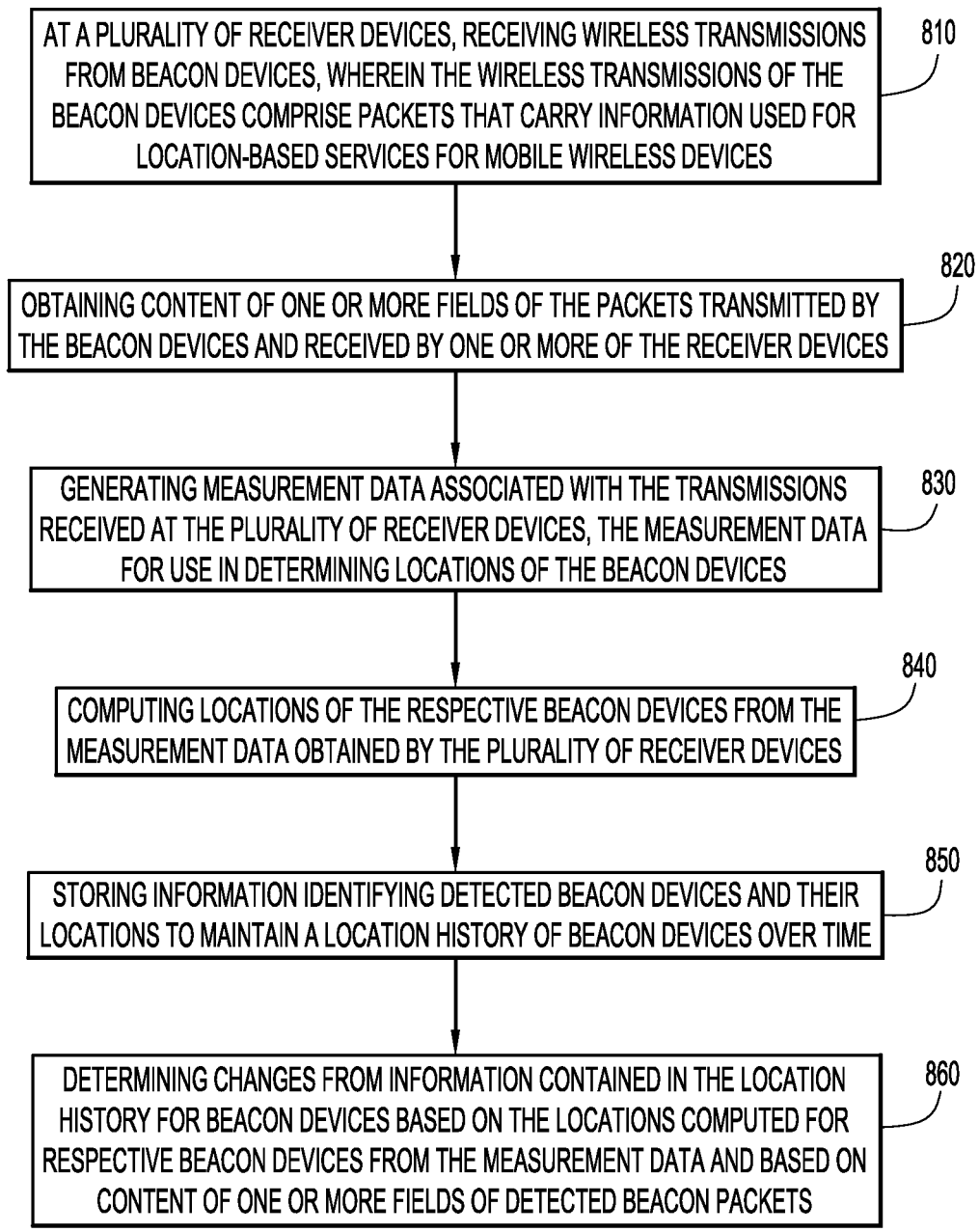
FIG. 8 is a flow chart generally depicting operations performed by the management server, according to an example embodiment.

Reference is now made to FIG. 8. FIG. 8 is a flow chart that generally depicts a method 800 for managing beacon devices according to the techniques presented herein. At 810, wireless transmissions from beacon devices are received at a plurality of receiver devices. The wireless transmissions of the beacon devices comprise packets that carry information used for location-based services for mobile wireless devices. For example, the packets transmitted by the beacon devices include information that advertises location-based services, such as according to the Bluetooth Low Energy communication protocol. At 820, content of one or more fields of the packets transmitted by the beacon devices and received by one or more of the plurality of receiver devices is obtained. At 830, measurement data associated with the transmissions received at the plurality of receiver devices is generated. The measurement data is for use in determining locations of the beacon devices. At 840, locations of the respective beacon devices are computed from the measurement data obtained by the plurality of receiver devices. At 850, information identifying detected beacon devices and their locations are stored to maintain a location history of beacon devices over time locations. At 860, changes from information contained in the location history are detected based on the locations computed for respective beacon devices from the measurement data and content of one or more fields of detected beacon packets. As explained above, at 860, changes that are determined may lead to declaring that a beacon device has moved to a new location, that a new beacon device has been detected (rogue or non-rogue), or that a beacon device is missing.

The techniques presented herein provide for enterprise-grade management of beacon devices. Automatic location of beacon devices is achieved, and the information of detected beacon device and any associated RSSI or location-equivalent measurement data is sent to a server for merging across receiver devices at which beacon packets are detected. Locations of beacon devices may be correlated to maps of venues. Automatic movement detection is achieved based on regular monitoring and estimated location change detection. Furthermore, automatic disappearance detection of beacon device is achieved based on regular monitoring and absence detection.

In one form, management of beacon devices is achieved by way of an overlay on existing WLAN AP deployments. The detected beacon devices are automatically placed on a location map, and reports can be generated for missing and moved beacon devices. Specifically, this management scheme is fully automated and requires no manual intervention or periodic manual checks of the beacon devices. The management is low latency in that any moved/lost beacon event is detected very quickly (as fast as the AP is scanning so in the order of minutes) whereas a manual check can only be intermittently and it might be many hours/days/weeks before an anomalous event is detected and reported.

Further still, these techniques do not require manually placing beacon devices at known locations on a map. Moreover, these techniques alleviate the need to manually walk around a venue to keep track of the health of the beacon devices In terms of rogue beacon device detection, the receiver devices serve as an overlay network of devices capable of receiving and decoding beacon signals (including programmable devices). The system of receiver devices regularly looks for beacon signals, decodes them, and compares them against a whitelist of trusted beacon devices. The whitelist may be more or less granular (MAC address, UUID, UUID and major ID, or UUID, major ID and minor ID).

To summarize, in one form, a method is provided comprising: at a plurality of receiver devices, receiving wireless transmissions from beacon devices, wherein the wireless transmissions of the beacon devices comprise packets that carry information used for location-based services for mobile wireless devices; obtaining content of one or more fields of the packets transmitted by the beacon devices and received by one or more of the plurality of receiver devices; generating measurement data associated with the transmissions received at the plurality of receiver devices, the measurement data for use in determining locations of the beacon devices; computing locations of the respective beacon devices from the measurement data obtained by the plurality of receiver devices; storing information identifying detected beacon devices and their locations to maintain a location history of beacon devices over time; and determining changes from information contained in the location history based on the locations computed for respective beacon devices from the measurement data and based on content of one or more fields of detected beacon packets.

In another form, an apparatus is provided comprising: a network interface unit configured to enable communications over a network; a memory; and a processor coupled to the memory and the network interface unit, wherein the processor is configured to: obtain measurement data associated with wireless transmissions received at a plurality of receiver devices from beacon devices, wherein the wireless transmissions of the beacon devices comprise packets that carry information used for location-based services for mobile wireless devices; obtain content of one or more fields of the packets transmitted by the beacon devices; compute locations of the respective beacon devices from the measurement data; store information identifying detected beacon devices and their locations to maintain a location history of beacon devices over time; and determine changes from information contained in the location history based on the locations computed for respective beacon devices from the measurement data and based on content of one or more fields of detected beacon packets.

In still another form, a system is provided comprising: a plurality of receiver devices, each of the receiver devices configured to: receive wireless transmissions from beacon devices, wherein the wireless transmissions of the beacon devices comprise packets that carry information used for location-based services for mobile wireless devices; and obtain content of one or more fields of the packets received from beacon devices at one or more of the receiver devices; generate measurement data associated received transmissions from the beacon devices, the measurement data for use in determining locations of the beacon devices; and a server configured to be in communication with the plurality of receiver devices, wherein the server is configured to: compute locations of the respective beacon devices from the measurement data obtained by the plurality of receiver devices; store information identifying detected beacon devices and their locations to maintain a location history of beacon devices over time; and determine changes from information contained in the location history based on the locations computed for respective beacon devices from the measurement data and based on content of one or more fields of detected beacon packets.

The above description is intended by way of example only. Various modifications and structural changes may be made therein without departing from the scope of the concepts described herein and within the scope and range of equivalents of the claims.

What is claimed is:

1. A method comprising:
   at a plurality of receiver devices, receiving wireless transmissions from beacon devices, wherein the wireless transmissions of the beacon devices comprise packets that carry information used for location-based services for mobile wireless devices;
   obtaining content of one or more fields of the packets transmitted by the beacon devices and received by one or more of the plurality of receiver devices;
   generating measurement data associated with the transmissions received at the plurality of receiver devices, the measurement data for use in determining locations of the beacon devices;
   computing locations of the respective beacon devices from the measurement data generated by the plurality of receiver devices;
   storing information identifying detected beacon devices and their locations to maintain a location history of beacon devices over time;
   determining differences between the locations of detected beacon devices stored in the location history and computed locations of the respective beacon devices based at least on the content of one or more fields of the packets transmitted by the beacon devices; and
   determining whether the differences are greater than a predetermined threshold.

2. The method of claim 1, wherein determining comprises determining whether a beacon device has moved to a new location.

3. The method of claim 2, wherein determining comprises comparing a location of a beacon device with information describing a perimeter within which the beacon device is expected to be located for purposes of determining whether a beacon device has moved to a new location.

4. The method of claim 1, wherein determining comprises determining whether a new beacon device has been detected.

5. The method of claim 4, wherein determining whether a new beacon device has been detected comprises comparing a location of a beacon device with information describing a predetermined region.

6. The method of claim 1, wherein determining comprises determining whether a beacon device is missing.

7. The method of claim 6, wherein determining that a beacon device is missing comprises determining if an update from any of the receiver devices that previously detected the beacon device is not obtained for a predetermined period of time or predetermined number of measurements.

8. The method of claim 1, further comprising generating a notification message to be sent to a network administrator person or entity, the notification message including information indicating detected changes of a beacon device.

9. The method of claim 1, wherein obtaining further comprises obtaining from packets transmitted by beacon devices, data representing operational state of beacon devices, and further comprising generating a notification message to be sent to a network administrator person or entity, the notification message including information representing operational state of beacon devices.

10. The method of claim 1, wherein determining differences comprises identifying a beacon device based on one or more identifiers contained in one or more fields of a packet received from the beacon device.

11. The method of claim 1, wherein computing, storing and determining differences and determining whether the differences are greater than the predetermined threshold are performed at a server.

12. The method of claim 1, wherein:
   receiving comprises receiving transmissions from beacon devices at at least one mobile wireless device;
   obtaining comprises obtaining content of one or more fields of packets received at the mobile wireless device; and
   the determining differences is based further on content of one or more fields of packets obtained by the mobile wireless device.

13. The method of claim 1, wherein obtaining content comprises obtaining from within a beacon packet information useful for path loss estimation associated with a beacon packet received at a receiver device.

14. The method of claim 1, receiving comprises receiving the wireless transmissions from beacon devices with wireless local area network access points that receive transmissions and send transmissions in a frequency band in which the beacon devices transmit.

15. The method of claim 1, wherein receiving comprises receiving wireless transmissions from beacon devices configured to transmit in accordance with a wireless personal area network communication protocol.

16. The method of claim 15, wherein receiving comprises receiving wireless transmissions that are transmitted in accordance with the Bluetooth Low Energy communication protocol.

17. An apparatus comprising:
   a network interface unit configured to enable communications over a network;
   a memory; and
   a processor coupled to the memory and the network interface unit, wherein the processor is configured to:
      generate measurement data associated with wireless transmissions received at a plurality of receiver devices from beacon devices, wherein the wireless transmissions of the beacon devices comprise packets that carry information used for location-based services for mobile wireless devices;
      obtain content of one or more fields of the packets transmitted by the beacon devices;
      compute locations of the respective beacon devices from the measurement data;

store information identifying detected beacon devices and their locations to maintain a location history of beacon devices over time; and determine differences between the locations of the detected beacon devices stored in the location history and computed locations of the respective beacon devices based at least on the content of one or more fields of the packets transmitted by the beacon devices; and determine whether the differences are greater than a predetermined threshold.

18. The apparatus of claim 17, wherein the processor is configured to determine whether one or more of: a beacon device has moved to a new location, a new beacon device has been detected, or a beacon device is missing.

19. The apparatus of claim 17, wherein the processor is configured to generate a notification message that includes information indicating detected changes of a beacon device.

20. The apparatus of claim 17, wherein the processor is configured to generate a notification message including information representing operational state of beacon devices based on data obtained from packets representing operational state of beacon devices.

21. A system comprising:
a plurality of receiver devices, each of the receiver devices configured to:
receive wireless transmissions from beacon devices, wherein the wireless transmissions of the beacon devices comprise packets that carry information used for location-based services for mobile wireless devices; and
obtain content of one or more fields of the packets received from beacon devices at one or more of the receiver devices;
generate measurement data associated with the received transmissions from the beacon devices, the measurement data for use in determining locations of the beacon devices; and a server configured to be in communication with the plurality of receiver devices, wherein the server is configured to:
compute locations of the respective beacon devices from the generated measurement data obtained by the plurality of receiver devices;
store information identifying detected beacon devices and their locations to maintain a location history of beacon devices over time; and
determine differences between the locations of the detected beacon devices stored in the location history and the computed locations of the respective beacon devices based at least on the content of one or more fields of the packets transmitted by the beacon devices; and
determine whether the differences are greater than a predetermined threshold.

22. The system of claim 21, wherein the plurality of receiver devices comprise or are part of wireless local area network access points that receive transmissions and sending transmissions in a frequency band in which the beacon devices transmit.

23. The system of claim 21, wherein the plurality of receiver devices are configured to receive wireless transmissions from beacon devices configured to transmit in accordance with the Bluetooth Low Energy communication protocol.

24. The system of claim 21, wherein the server is configured to determine whether one or more of: a beacon device has moved to a new location, a new beacon device has been detected, or a beacon device is missing.

25. The system of claim 21, wherein the server is configured to generate a notification message that includes information indicating detected changes of a beacon device.

* * * * *